United States Patent
Taylor (10) Patent No.: US 6,288,823 B1
(45) Date of Patent: Sep. 11, 2001

(54) SLOW WAVE ELECTROOPTIC LIGHT MODULATOR APPARATUS AND METHOD

(75) Inventor: Henry F. Taylor, College Station, TX (US)

(73) Assignee: Texas A&M University System, College Station, TX (US)

( * ) Notice: Subject to any disclaimer, the term of this patent is extended or adjusted under 35 U.S.C. 154(b) by 0 days.

(21) Appl. No.: 09/427,957

(22) Filed: Oct. 27, 1999

(51) Int. Cl.$^7$ ..................................................... G02F 1/03
(52) U.S. Cl. ..................... 359/251; 359/254; 359/261; 359/298
(58) Field of Search .................. 359/245, 251, 359/252, 254–257, 261, 298, 300, 317

(56) References Cited

U.S. PATENT DOCUMENTS

| | | | |
|---|---|---|---|
| 4,984,861 | * 1/1991 | Suchoski, Jr. et al. | 359/245 |
| 5,007,695 | * 4/1991 | Chang | 359/245 |
| 5,315,422 | * 5/1994 | Utaka et al. | 359/107 |
| 5,640,267 | * 6/1997 | May et al. | 359/322 |

OTHER PUBLICATIONS

K. Noguchi, H. Miyazawa, and O. Mitomi, "Frequency Dependent Propagation Characteristics of Coplanar Waveguide Electrode on 100 GHz Ti:LiNbO3 Optical Modulator," Electronic Letters, vol. 34, pp. 661–663, 1998.

R. R. Neurgaonkar, W. F. Hall, J. R. Oliver, and W. K. Cory, "Tungsten Bronze Sr1–xBaxNb2O6: A Case History of Versatility," Ferroelectrics, vol. 87, pp. 167–169, 1988.

H. S. Lee, J. P. Wilde, and R. S. Feigelson, "Bridgman Growth of Strontium Barium Niobate," J. Crystal Growth, vol. 187, pp. 89–101, 1998.

J. M. Marx, Z. Tang, O. Eknoyan, H. F. Taylor and R. R. Neurgaonkar, "Low–Loss Strain Induced Optical Waveguides in Strontium Barium Niobate (Sr0.6Ba0.4Nb2O6) at 1.3 um Wavelength", Appl. Phys. Lett., vol. 66, pp. 274–276, 1995.

D. Kip, S. Aukkemeyer, and P. Moretti, "Low–Loss Planar Optical Waveguides in Strontium Barium Niobate Crystals Formed by Ion–Beam Implantation", Opt. Lett., vol. 20, pp. 1256–1258, 1995.

E. E. Robertson, R. W. Eason, M. Kaczmarek, P. J. Chandler, and X. Huang, "Ion–Beam Manipulation of the Photorefractive Properties of Strontium Barium Niobate Planar Waveguides", Opt. Lett., vol. 21, pp. 641–643, 1996.

M. A. Fardad, "SBN Photonic Devices", Proc. SPIE, vol. 3278, pp. 238–244, 1998.

(List continued on next page.)

*Primary Examiner*—Huy Mai
(74) *Attorney, Agent, or Firm*—J. Nevin Shaffer, Jr.; Shaffer & Culbertson, LLP (57) ABSTRACT

A highly efficient electrooptic means and method of light modulation utilizing slow wave optical propagation is provided. A grating structure (35) integrated with a single mode optical waveguide (32) on an electrooptic substrate (30) induces coupling between forward- and reverse-propagating light waves. This contradirectional coupling leads to a reduction in the optical propagation speed in the forward direction. Electrodes (38a and 38b) are provided for applying an electric field to modulate the light propagating in the waveguide (32) via the linear electrooptic (Pockels) effect. In a preferred embodiment, a modulating radio frequency or microwave signal applied to the electrodes (38a and 38b) propagates in the same direction as the modulated light wave at substantially the same velocity.

20 Claims, 3 Drawing Sheets

OTHER PUBLICATIONS

J. M. Marx, O. Eknoyan, H. F. Taylor, and R. R. Neurgaonkar, "GHz–Bandwidth Optical Intensity Modulation in Self–Poled Waveguides in Strontium Barium Niobate (SBN)", IEEE Photonics Technol. Lett., vol. 8, pp. 1024–1025, 1996.

K. Atsuki and E. Yamashita, "Transmission Line Aspects of the Design of Broadband Electrooptic Traveling–Wave Modulators", J. Lightwave Technol., vol. 5, pp. 316–319, 1987.

E. H. Turner, "High Frequency Electrooptic Coefficients of LiNbO3", Appl. Phys. Lett., vol. 8, pp. 303–304, 1966.

E. L. Venturini, E. G. Spencer, P. V. Lenzo, and A. A. Ballman, "Refractive Indices of Strontium Barium Niobate", J. Appl. Phys., vol. 39, pp. 343–344, 1968.

O. Kwon, O. Ednoyan, H. F. Taylor, and R. R. Neurgaonkar, "New Low–Voltage Electrooptic Modulator in SBN:60", submitted for application.

O. Eknoyan, H. F. Taylor, W. Matous, T. Ottinger, and R. R. Neurgaonkar, "Comparison of Photorefractive Damage Effects in LiNbO3, LiTaO3 and Ba1–xSrxNb2–yO6 Optical Waveguides at 488 nm Wavelength", Appl. Phys. Lett., vol. 71, pp. 3051–3053, 1997.

G. K. Gopalakrishnan, W. K. Burns, R. W. McElhanon, C. H. Bulmer, and A. S. Greenblatt, "Performance and Modeling of Broadband LiNbO3 Traveling Wave Optical Intensity Modulators", J. Lightwave Technol., vol. 12, pp. 1807–1818, 1994.

P. V. Lenzo, E. G. Spencer, and A. A. Ballamn, "Electro–optic Coefficients of Ferroelectric Strontium Barium Niobate", Appl. Phys. Lett., vol. 11, pp. 23–25, 1967.

O. Mitumi, K. Noguchi, and H. Miyazawa, "Design of Ultra–Broadband LiNbO3 Modulators with Ridge Structure", IEEE Trans. on Microwave Theory and Techn., Vol. 43, pp. 2203–2207, 1995.

G. D. Boyd, W. L. Bond, and H. L. Carter, "Refractive Index as a Function of Temperature in LiNbO3", J. Appl. Phys., vol. 38, pp. 1941–1943, 1967.

L. P. Kaminow and E. H. Turner, "Electrooptic Light Modulators", Proc. IEEE, vol. 54, pp. 1374–1390, 1966.

C. H. Bulmer, "Sensitive, Highly Linear Lithium Niobate Interferometers for Electromagnet Field Sensing", Appl. Phys. Lett., vol. 53, pp. 2368–2370, 1988.

D. H. Naghski, J. T. Boyd, H. E. Jackson, S. A. Kingsley, and J. Latess, "An Integrated photonic Mach–Zehnder Interferometer with No Electrodes for Sensing Electric Fields", J. Lightwave Technol., vol. 12, pp. 1092–1097, 1994.

* cited by examiner

SLOW WAVE ELECTROOPTIC LIGHT MODULATOR APPARATUS AND METHOD

STATEMENT REGARDING FEDERALLY SPONSORED RESEARCH OR DEVELOPMENT

The U.S. Government has a paid-up license in this invention and the right in limited circumstances to require the patent owner to license others on reasonable terms, as provided for by the terms of Grant No. ECS-9522740 awarded by the National Science Foundation.

TECHNICAL FIELD OF THE INVENTION

This invention relates in general to the field of electrooptics, and in particular to electrooptic devices for the modulation of light.

BACKGROUND OF THE INVENTION

Interferometric electrooptic modulators fabricated in the substrate material lithium niobate (LN) are widely used in digital communication systems operating at 2.5 Gb/s and 10 Gb/s and in analog systems for cable television. Not only are modulator rise and fall times <10 ps achieved with this technology, but interferometric designs provide the chirp free performance needed for long-distance transmission. These devices utilize a traveling wave (TW) configuration in which the modulating microwave signal propagates in a strip line or coplanar waveguide on the surface of the insulating substrate in the same direction as the modulated light wave, as described by G. K. Gopalakrishnan et al. in *Journal of Lightwave Technology*, vol 12, pp. 1807–1818, 1994. Best performance for high speed or high bandwidth modulation is achieved if the velocity of the modulating radio frequency wave closely matches that of the modulated optical wave. Present practice for the highest bandwidths (>>1 GHz) is to use very thick ($\approx$15–30 $\mu$m) electrodes to achieve velocity matching by increasing the microwave propagation speed to match that of the optical carrier.

In spite of recent commercial success, the present TW modulator technology still has some shortcomings. Electrical power required to drive the modulators at microwave frequencies is high (typically several hundred mW for a pi-radian phase retardation). This means that a medium power microwave amplification circuit is needed in each transmitter. In the case of analog transmission, the relatively low sensitivity of modulated power to applied voltage and the inherent nonlinearity in dependence of modulated power on applied voltage can adversely affect link dynamic range. Further, the requirement for very thick electrodes on the LN substrate substantially increases the fabrication cost of the modulator chip.

One approach to overcoming these shortcomings is to use a material which supports a stronger electrical/optical interaction. Ferroelectric materials such as strontium barium niobate (SBN) with much higher electrooptic coefficients than LN have been known for decades, and low-loss waveguides and GHz-bandwidth modulation have recently been demonstrated in such materials. However, it is well known that materials with such high electrooptic coefficients also have very large dielectric constants. This means that microwave propagation is very slow, so that prohibitively thick electrodes are needed for velocity matching by the conventional method.

SUMMARY OF THE INVENTION

In accordance with the present invention, a method and apparatus are provided for the modulation of light which substantially eliminate or reduce disadvantages and problems associated with prior methods and apparatuses.

In particular, the present invention makes use of a grating structure integrated with the waveguide to induce slow wave optical propagation in optical waveguides. The grating structure induces contradirectional coupling of light in the waveguide whereby the light bounces back and forth in the waveguide as it propagates through it. This causes the transmitted light to emerge from the waveguide at a later time than would be the case if the grating structure were not present. For the purposes of this invention, the phenomenon whereby the forward propagating optical wave is slowed due to the integrated grating structure is identified as "slow wave optical propagation."

In one embodiment of the present invention, a device for modulating the phase of a light wave is provided. In this embodiment a phase modulator comprises a single mode optical waveguide on a substrate of an electrooptic material. A grating structure integrated with the waveguide results in slow wave optical propagation. The grating structure is formed as a corrugation on the surface of the waveguide or as a refractive index variation in the waveguide material. Electrodes on the surface of the substrate are disposed to produce an electric field in the slow wave propagation region of the waveguide in response to a voltage V(t) applied across the electrodes. The electric field causes a change in the refractive index of the material in and near the optical waveguide, resulting in a modulation of the phase of the forward propagating light wave. In a preferred embodiment, the electrodes are disposed to form a transmission line, such that an applied voltage signal V(t) produces a traveling electromagnetic wave which propagates in the same direction as the incident light wave. The desired result is that the velocity of the modulated light wave matches that of the modulating electromagnetic wave.

In another embodiment of the present invention, a device for modulating the intensity of a light wave is provided. In this embodiment an intensity modulator comprises a Mach Zehnder waveguide interferometer on a substrate of an electrooptic material. The interferometer consists of an input single mode optical waveguide section, a branching waveguide region whereby the input waveguide diverges into two parallel waveguide sections, and a second branching waveguide region whereby the two parallel waveguide sections converge to form an output single mode waveguide section. Grating structures integrated with the two parallel waveguide sections between the branches induce slow wave optical propagation. Electrodes on the surface of the substrate are disposed to produce electric fields in these slow wave propagation regions in response to a voltage V(t) applied across the electrodes. These electric fields are of substantially the same magnitude but opposite in sign in the two waveguide sections which support slow wave optical propagation. The electric fields cause changes in the refractive index of the material in and near the slow wave propagation regions, resulting in a modulation of the phase of the forward propagating light waves in each. The phase modulation is substantially the same in magnitude but opposite in sign in the two slow wave optical propagation regions. A light wave coupled into the input optical waveguide section and propagates through the Mach Zehnder waveguide interferometer experiences intensity modulation in response to the voltage V(t) due to optical interference of the phase modulated light waves in the waveguide sections which support slow wave optical propagation. In a preferred embodiment, the electrodes are disposed such that an input voltage signal applied to them propagates in the same direction as the incident light wave in the slow wave optical propagation regions. The desired result is that the speed of the phase modulated light wave in the slow wave optical propagation regions matches that of the modulating electromagnetic wave. Furthermore, in cases where the modulator is used in the transmission of analog signals, the grating structure is designed to produce a dependence of modulated optical power on applied voltage which is substantially more linear than the sinusoidal dependence characteristic of conventional Mach-Zehnder modulators.

An important advantage of the present invention is that slowing the speed of optical propagation in the electrical-optical interaction region enables velocity matching between the modulated light wave and a modulating radio frequency or microwave signal in materials in which the microwave propagation speed is normally much lower than the optical propagation speed. It is well known in the art that velocity matching is required for very high frequency modulation performance. Conventional high frequency modulators in lithium niobate (LN) substrates achieve velocity matching by speeding the microwave propagation through the use of very thick (15–30 $\mu$m) electrodes, as described by K. Noguchi et al. in *Electronics Letters*, vol. 34, pp. 661–663, 1998. In the present invention, velocity matching, as disclosed above and more fully hereafter, is achieved with thin (<1 $\mu$m) electrodes, which are much simpler and less expensive to produce than the very thick electrodes.

Another advantage of the present invention is the ability to achieve velocity matching in materials with very high dielectric constants, such as strontium barium niobate (SBN). The conventional approach to velocity matching using thick electrodes is not practical in such materials, because electrode thicknesses >100 $\mu$m would be required. Manufacturing of such thick electrodes would either be impossible or prohibitively expensive. Materials such as SBN are preferred for modulator application because they possess very large electrooptic coefficients, generally designated $r_{ij}$ coefficients in the art. For example, $r_{33}$ in the SBN compositions known as SBN:60 and SBN:75 are 420 pm/V and 1400 pm/V, respectively, vs. 30.8 pm/V in LN. Large electrooptic coefficients make it possible to achieve a given modulator performance with unprecedented low applied voltage and low electrical power supplied to the device.

Yet another advantage of the present invention is the enhancement of modulation efficiency due to the fact that optical propagation is slower than in conventional electrooptic modulators. Since the light is present for a longer time in the electrical-optical modulation region in the slow wave modulator of the present invention, a much larger phase shift is achieved in response to a given driving voltage V(t).

A further advantage of the present invention, particularly in systems for transmission of analog signals, is the improved linearity of dependence of modulated optical power on applied voltage which may be achieved through appropriate design of the aforementioned integrated grating structure.

Combining these attributes, the present invention provides a means and method of modulating light at very high speeds with order-of-magnitude reduction over prior art in both voltage and electrical power required to achieve a desired modulation performance.

BRIEF DESCRIPTION OF THE DRAWINGS

Other objects, features and advantages of the present invention will become more fully apparent from the following detailed description of the preferred embodiment, the appended claims and the accompanying drawings, wherein like reference numerals represent like parts, in which:

DETAILED DESCRIPTION OF THE PREFERRED EMBODIMENTS

Figure 1:
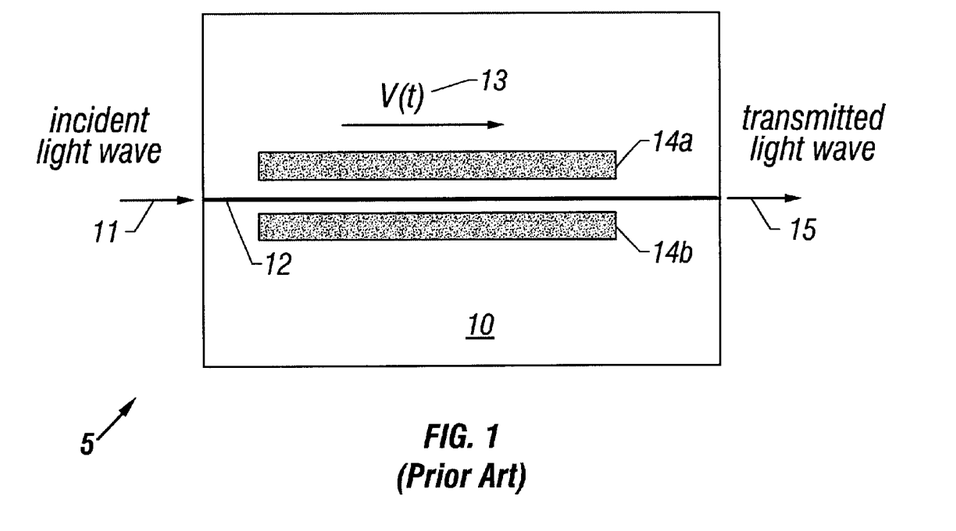
FIG. 1 is a simplified schematic of a conventional prior art electrooptic phase modulator.

The preferred embodiment of the present invention is illustrated by way of example in FIGS. 3–6. With reference to the drawings, FIG. 1 illustrates a conventional prior art electrooptic phase modulator 5. A single mode optical waveguide 12 is formed on a substrate 10 of a material which exhibits the linear (Pockels) electrooptic effect. Waveguide 12 is positioned to receive an input light wave 11. Metal electrodes 14a and 14b are formed on the surface of the substrate 10. A dynamic voltage 13 V(t) applied between the electrodes 14a and 14b generates an electric field in and around the optical waveguide 12. The phase of light propagating through the waveguide 12 is modulated in proportion to V(t) 13 via the linear electrooptic (Pockels) effect. The modulating voltage signal applied between the electrodes 14a and 14b propagates in the same direction as the modulated, transmitted light wave 15. In common practice, the substrate 10 is a crystal of lithium niobate (LN), the waveguide 12 is produced by diffusing titanium atoms into the substrate 10, and the electrodes 14a and 14b are made of gold.

Figure 2:
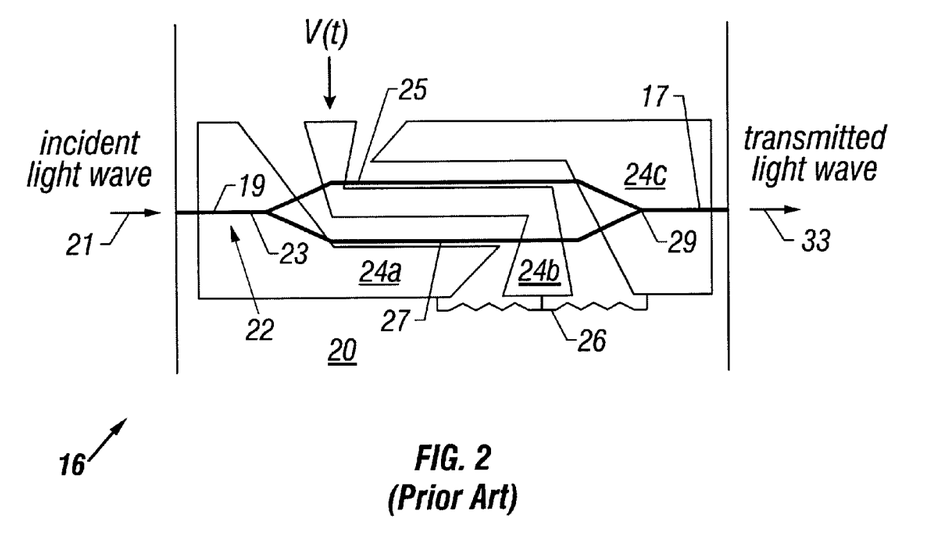
FIG. 2 is a simplified schematic of a conventional prior art traveling wave electrooptic intensity modulator.

FIG. 2 illustrates a conventional, prior art, traveling wave electrooptic intensity modulator 16. A single mode optical waveguide 22 is formed on a substrate 20 of a material which exhibits the linear (Pockels) electrooptic effect. Waveguide 22 is positioned to receive an input light wave 21. The waveguide is configured as a Mach Zehnder interferometer consisting of an input straight waveguide section 19, a branch 23 whereby the input straight waveguide section 19 diverges to form two parallel waveguide sections 25 and 27, and a second converging branch 29 whereby the two parallel waveguide sections 25 and 27 converge to form an output waveguide section 17. Metal electrodes 24a, 24b, and 24c are formed on the surface of the substrate 20. A voltage V(t) applied between the center electrode 24b and the two outer electrodes 24a and 24c generates an electric field in and around the two parallel optical waveguide sections 25 and 27. The magnitude of the electric field is substantially the same in the vicinity of the two parallel waveguide sections 25 and 27, but the sign (direction) of the electric field is opposite. The electric fields cause changes in the refractive index of the material 20 in and near the parallel waveguide sections 25 and 27 via the linear electrooptic (Pockels) effect, resulting in a modulation of the phase of the forward propagating waves. The phase modulation is substantially the same in magnitude but opposite in sign in the two parallel waveguide sections 25 and 27. An incident light wave 21 which is coupled into the input optical waveguide 22 and propagates through the Mach Zehnder interferometer experiences intensity modulation in the transmitted light wave 33 in response to the voltage V(t) due to optical interference of the phase modulated light waves. An input voltage signal applied to the electrodes 24a, 24b and 24c produces a traveling electromagnetic wave which propagates in the same direction as the incident light wave in the parallel waveguide sections 25 and 27. Desirably, the speed of the phase modulated light wave in the parallel waveguide sections 25 and 27 matches that of the modulating electromagnetic wave. In common practice, the substrate is a crystal of lithium niobate (LN), the waveguide 22 is produced by diffusing titanium atoms into the substrate, and the electrodes 24a, 24b and 24c are made of gold.

Figure 3:
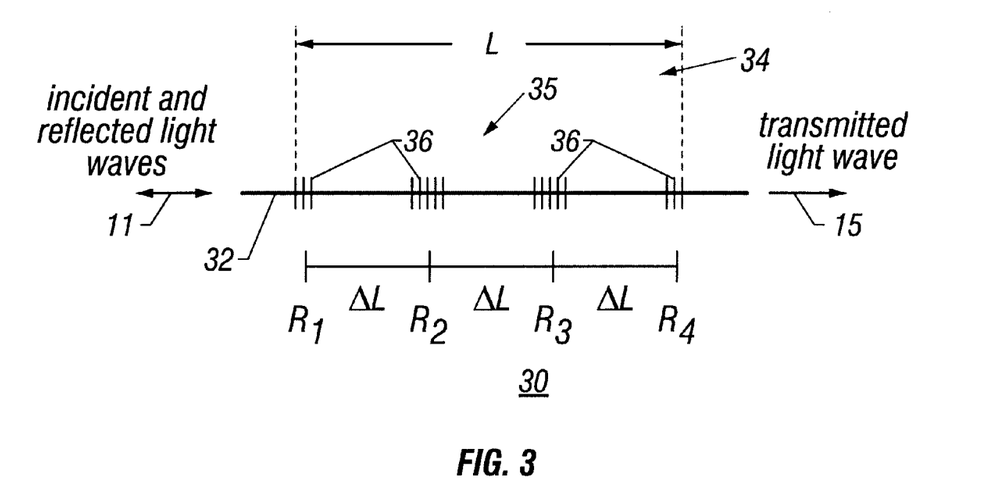
FIG. 3 is a top view of a slow wave optical propagation region in accordance with the present invention.

FIG. 3 illustrates a slow wave propagation region 34 in an optical waveguide 32 in accordance with the present invention. A single mode optical waveguide 32 is formed on a substrate 30 of a material which exhibits the linear electrooptic (Pockels) effect. Waveguide 32 is positioned to receive an incident light wave 11. Preferably, the velocity of microwave propagation in the substrate material is lower than the velocity of optical propagation in the waveguide 32. Suitable substrate materials 30 include lithium niobate (LN), lithium tantalate (LT), and strontium barium niobate (SBN), all three materials being of monocrystalline form. Waveguides 32 in LN and LT can be formed, for example, by in diffusion of titanium or nickel, and in SBN by indiffuision of sulfur or zinc. Alternatively, waveguides 32 can be formed in all three substrate materials 30 by the effect of a strain-inducing surface film as described by O. Eknoyan et al. in *Applied Physics Letters*, Vol. 60, pp. 407–409, 1992. Any other suitable materials and waveguides now known or hereafter developed may be used as well.

A grating structure 35 integrated with a portion of single mode waveguide 32 forms a slow wave propagation region 34 of length L. The grating structure 35 consists of a multiplicity of grating reflectors 36 with a center-to-center spacing ΔL. Reflectances of grating reflectors 36 are designated $R_j$, j=1,2, ..., N, with N the number of reflectors 36. In the illustration of FIG. 3 the value of N is 4, but it is understood that the present invention can be implemented with other numbers of reflectors 36, so long as N≧2.

Metal electrodes 38a and 38b are formed on the surface of the substrate 30. A dynamic voltage V(t) applied between the electrodes 38a and 38b generates an electric field in and around the optical waveguide 32 in the slow wave propagation region 34. The phase of light propagating through the waveguide is modulated in proportion to V(t) via the linear electrooptic (Pockels) effect. The modulating voltage waveform V(t) propagates in the same direction as the modulated light wave.

Figure 4:
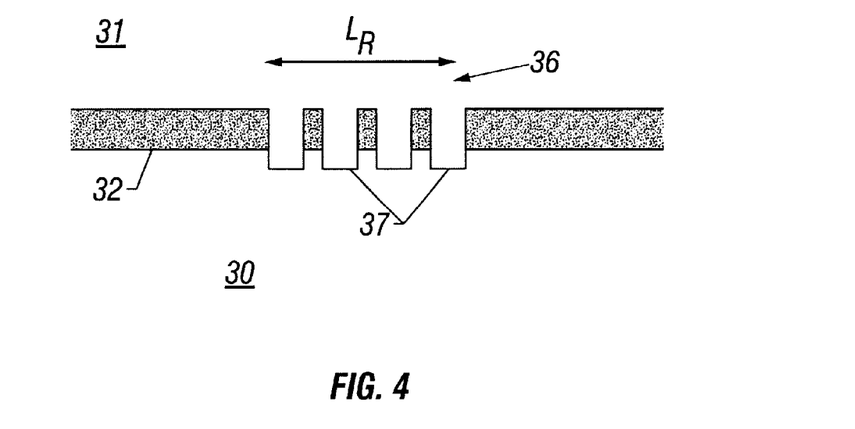
FIG. 4 is a side view of a corrugated grating reflector, a multiplicity of which can be integrated with an optical waveguide to produce slow wave optical propagation in accordance with the present invention.

One preferred embodiment for realizing grating reflectors 36 is the corrugated grating illustrated in side view in FIG. 4. Waveguide 32 is formed on substrate 30, as heretofore described. The medium 31 above and adjacent to the waveguide 32 is air. A grating reflector 36 of extent $L_R$ is formed by a multiplicity of corrugations 37 etched into the waveguide 32 and substrate 30. The corrugations 37 can be formed, for example, by plasma etching, reactive ion etching, ion milling, or chemical etching, with a mask to define the material to be etched (corrugations) or by any method now known or hereafter developed. Light propagating in waveguide 32 is reflected at the dielectric interfaces formed by the corrugations 37. For example, it is well known that the reflectance R for a single such interface, defined as the ratio of reflected optical power to incident optical power, is given by the Fresnel formula $$R = \left|\frac{n_1 - n_2}{n_1 + n_2}\right|^2 \quad (1)$$

with $n_1$ and $n_2$ the refractive indices of the media adjacent to the interface. For example, if $n_1$=2.15, approximately the effective refractive index of a waveguide mode in LN or SBN, and $n_2$=1.00, the refractive index of air, then R=0.133. Furthermore, with two such interfaces, as would be formed by a single corrugation 37, the reflectance would be almost 4 times this value (0.133×4=0.53), provided that the width of the corrugation is λ/4 with λ the optical wavelength. Thus, for an optical wavelength of 1.5 μm, the total length $L_R$ of a grating reflector 36 needed to provide a reflectance near 50% is only 0.38 μm. Multiple reflectors 36 with quarter wave spacing will give correspondingly higher reflectance values. Thus, it is evident that very short grating reflectors 36, with length of the order of 1 μm, can give very high reflectances (>90%).

As an alternative to the deep corrugations 37 illustrated in FIG. 4, grating reflectors 36 for realization of the slow wave propagation region 34 could consist of shallow corrugations which extend only part way through the waveguide 32. Another alternative is to use refractive index variations in the waveguide material and adjacent substrate material to form the grating reflectors 36. Such gratings can be written holographically in materials such as LN and SBN by the photorefractive effect through the interference of laser beams in the waveguide 32 and substrate materials 30. Preferably, the wavelength of the interfering laser beams is in the ultraviolet region of the spectrum.

It is desirable to minimize the optical power reflected from the slow wave optical propagation region 34, since this reflected power constitutes an optical loss for the modulator. This is accomplished by the appropriate choice of the spacing ΔL of the grating reflectors 36. In particular, if the round trip optical phase change Δϕ between reflectors 36, given by is equal to (2m+1)π

$$\Delta\phi = \frac{4\pi n_1 \Delta L}{\lambda} \quad (2)$$

radians, with m an integer, $n_1$ the refractive index of the optical waveguide mode, and π the wavelength of the incident (unmodulated) light wave 11, then reflective contributions from adjacent mirrors will interfere destructively, thereby tending to minimize the optical power reflected for the slow wave optical propagation region 34. Combining this condition with eq. (2) yields as the $$\Delta L = \frac{(2m+1)\lambda}{4n_1} \quad (3)$$

condition on ΔL to minimize the reflectance from the slow wave region 34. For example, if λ=1.5 μm, $n_1$=2.15, and m=2000, then it is calculated from eq. (3) that ΔL=697.84 μm.

As an alternative to discrete grating reflectors 36, it is evident that a continuous grating can be integrated with a single mode waveguide 32 to provide a slow wave propagation region 34. Such a continuous grating, preferably formed as shallow corrugations 37 on the waveguide surface, or as a photorefractive holographic grating in the material 30 of the waveguide 32 and substrate, could subtend the entire length of the slow wave propagation region 34 with minimal or no gaps in the grating pattern.

Figure 5:
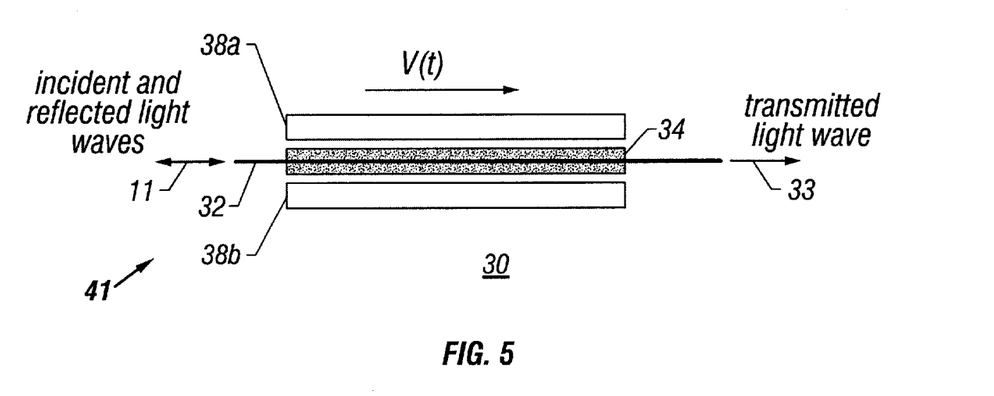
FIG. 5 is a top view of a traveling wave electrooptic phase modulator using slow wave optical propagation apparatus in accordance with the present invention.

FIG. 5 illustrates a phase modulator 41 incorporating the slow wave optical propagation of the present invention. A single mode optical waveguide 32 is formed on a substrate 30 of a material which exhibits the linear (Pockels) electrooptic effect. Waveguide 32 is positioned to receive an input light wave 11. A slow wave optical propagation region 34 is formed by a grating structure (as discussed above) integrated with the optical waveguide 32. Metal electrodes 38a and 38b are formed on the surface of the substrate 30. A dynamic voltage V(t) applied between the electrodes 38a and 38b generates an electric field in and around the optical waveguide 32. The phase of light propagating through the waveguide 32 and exiting therefrom is modulated in proportion to V(t) via the linear electrooptic (Pockels) effect. The modulating voltage signal applied between the electrodes 38a and 38b propagates in the same direction as the modulated light wave. By way of the present invention, the speed of the phase modulated light wave in the slow wave optical propagation region matches that of the modulating electromagnetic wave. The substrate 30 can be a crystal of LN or SBN; the waveguide 32 can be produced by diffusing titanium or nickel atoms into the substrate in the case of LN, or by diff-using sulfur or zinc atoms into the substrate in the case of SBN, or by a strain-inducing film on the surface of the substrate for either LN or SBN; and the electrodes can be made of gold. Obviously, any other substrate 30 and waveguide 32 now know or hereafter developed that are suitable may be utilized.

Figure 6:
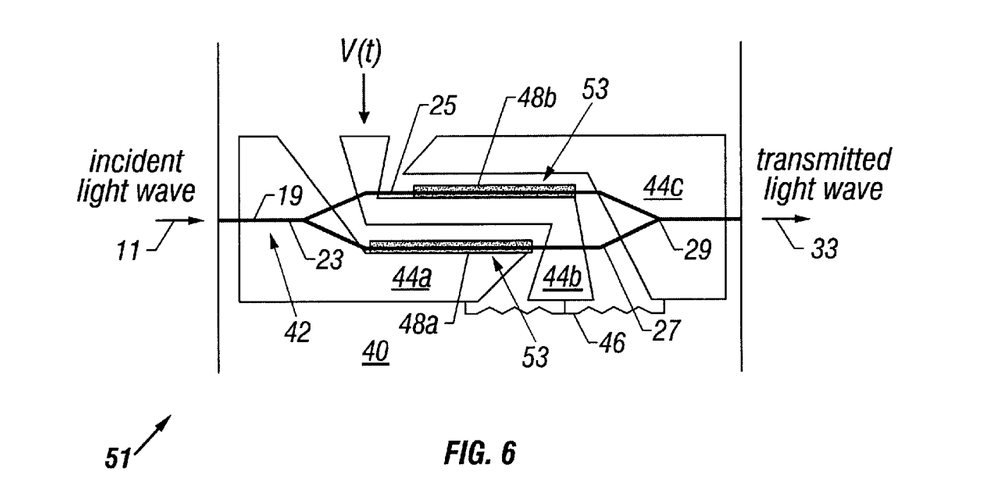
FIG. 6 is a top view of a traveling wave electrooptic intensity modulator using slow wave optical propagation apparatus in accordance with the present invention.

FIG. 6 illustrates an electrooptic intensity modulator 51 incorporating slow wave optical propagation of the present invention. A single mode optical waveguide 42 is formed on a substrate 40 of a material which exhibits the linear (Pockels) electrooptic effect. Waveguide 42 is positioned to receive an input, incident, light wave 11. The waveguide 42 is configured as a Mach Zehnder interferometer consisting of an input straight waveguide section 19, a branch 23 whereby the input straight waveguide section 19 diverges to form two parallel waveguide sections 25 and 27, and a second branch 29 whereby the two parallel waveguide sections 25 and 27 converge to form an output waveguide section 17. Slow wave optical propagation regions 48a and 48b are formed by a grating structure 53 integrated with the two parallel sections 25 and 27 of optical waveguide 42. Metal electrodes 44a, 44b, and 44c are formed on the surface of the substrate 40. A voltage V(t) applied between the center electrode 44b and the two outer electrodes 44a and 44c generates an electric field in and around the two parallel optical waveguide sections 25 and 27. The magnitude of the electric field is substantially the same in the vicinity of the two parallel waveguide sections 25 and 27, but the sign (direction) of the electric field is opposite. The electric fields cause changes in the refractive index of the material in and near the parallel waveguide sections 25 and 27 via the linear electrooptic (Pockels) effect, resulting in a modulation of the phase of the forward propagating waves. The phase modulation is substantially the same in magnitude but opposite in sign in the two parallel waveguide sections 25 and 27. A light wave 11 which is coupled into the input optical waveguide 42 and propagates through the Mach Zehnder interferometer as transmitted light wave 33 experiences intensity modulation in response to the voltage V(t) due to optical interference of the phase modulated light waves. An input voltage signal applied to the electrodes 44a, 44b and 44c produces a traveling electromagnetic wave which propagates in the same direction as the incident light wave 11 in the parallel waveguide sections 25 and 27. In accordance with the invention, the speed of the phase modulated light wave in the slow wave optical propagation regions 48a and 48b matches that of the modulating electromagnetic wave. The substrate 40 can be a crystal of LN or SBN; the waveguide 42 can produced by diffusing titanium or nickel atoms into the substrate 40 in the case of LN, or by diffusing sulfur or zinc atoms into the substrate 40 in the case of SBN, or by a strain-inducing film on the surface of the substrate 40 for either LN or SBN; and the electrodes 44a, 44b and 44 can be made of gold or aluminum. Again, any now known or hereafter developed substrate, waveguide, and/or electrodes suitable for the invention disclosure herein may be omitted.

While the present invention has been disclosed in connection with the preferred embodiment thereof, it should be understood that there may be other embodiments which fall within the spirit and scope of the invention as defined by the following claims.

What is claimed is:

1. A slow wave electrooptic phase modulator for changing the phase of an incident light wave comprising:
   (a) a substrate of a material which exhibits a linear electrooptic effect;
   (b) a single mode optical waveguide formed on said substrate and positioned to receive said incident light wave;
   (c) a grating structure integrated with said optical waveguide and disposed to produce contradirectional coupling of light in said optical waveguide, thereby decreasing the forward propagation velocity of said light;
   (d) a source of electrical potential; and
   (e) electrodes connected to said source disposed to produce an electric field in and around said optical waveguide in response to said source applied between said electrodes.

2. The apparatus of claim 1, configured such that an input modulating radio frequency or microwave voltage propagates along said electrodes in the same direction as a modulated light wave.

3. The apparatus of claim 2, wherein the modulating radio frequency or microwave voltage propagates along said electrodes at substantially the same velocity as the modulated light wave.

4. The apparatus of claim 2, wherein the grating structure comprises multiple corrugations formed on the surface of said optical waveguide.

5. The apparatus of claim 4, wherein the grating structure consists of multiple grating reflectors, each of uniform spatial period, such that a round trip optical phase shift between said grating reflectors at the frequency of the incident light wave is $(2m+1)\pi$ radians, with m a positive integer.

6. The apparatus of claim 2, wherein the grating structure comprises refractive index variations in the substrate of said optical waveguide.

7. The apparatus of claim 6, wherein the grating structure consists of multiple grating reflectors, each of uniform spatial period, such that a round trip optical phase shift between said grating reflectors at the frequency of the incident light wave is $(2m+1)\pi$ radians, with m a positive integer.

8. A slow wave electrooptic intensity modulator for changing the intensity of an incident light wave comprising:

(a) a substrate of a material which exhibits a linear electrooptic effect;

(b) an optical waveguide interferometer formed on said substrate and positioned to receive said incident light wave, comprising of an input single mode waveguide section, a waveguide branch diverging to two single mode waveguide sections, and a second waveguide branch whereby said two single mode waveguide sections converge to form an output single mode waveguide section;

(c) two slow wave optical propagation regions, disposed in said two single mode waveguide sections between two said branches, each comprising a grating structure integrated with said two waveguide sections, such that said grating structure is disposed to produce contradirectional coupling of light in said optical waveguide, thereby decreasing the forward propagation velocity of said light;

(d) a source of electrical potential; and (e) electrodes connected to said source disposed to produce electric fields of opposite sense in said slow wave propagation regions of said two waveguide sections, in response to said source.

9. The apparatus of claim 8, configured such that an input modulating radio frequency or microwave voltage propagates along said electrodes in the same direction as a modulated light wave.

10. The apparatus of claim 9, wherein the modulating radio frequency or microwave voltage propagates along said electrodes at substantially the same velocity as the modulated light wave.

11. The apparatus of claim 9, wherein the grating structure comprising multiple corrugations formed on the surface of said optical waveguide.

12. The apparatus of claim 11, wherein the grating structure comprises multiple grating reflectors, each of uniform spatial period, such that a round trip optical phase shift between said grating reflectors at the frequency of the incident light wave is $(2m+1)\pi$ radians, with m a positive integer.

13. The apparatus of claim 12, wherein the grating structure is conformed so as to produce a substantially linear dependence of modulated optical power on modulating voltage over a specified range of said modulating voltage.

14. The apparatus of claim 9, wherein the grating structure comprising refractive index variations in the substrate of said optical waveguide.

15. The apparatus of claim 14, wherein the grating structure comprises multiple grating reflectors, each of uniform spatial period, such that a round trip optical phase shift between said grating reflectors at the frequency of the incident light wave is radians, with m a positive integer.

16. The apparatus of claim 15, wherein the grating structure is conformed so as to produce a substantially linear dependence of modulated optical power on modulating voltage over a specified range of said modulating voltage.

17. A slow wave electrooptic phase modulator method for changing the phase of an incident light wave comprising the steps of:

(a) providing a substrate of material which exhibits a linear electrooptic effect;

(b) forming a single mode optical waveguide on said substrate and positioning it so as to receive said incident light wave;

(c) integrating a grating structure with said optical waveguide disposed so as to produce contradirectional coupling of light in said optical waveguide, thereby decreasing the forward propagation velocity of said light;

(d) providing a source of electrical potential;

(e) connecting electrodes to said source and disposing said electrodes so as to produce an electrical field in and around said optical waveguide in response to said source; and (f) activating said source of electrical potential.

18. The method of claim 17 wherein the step of integrating said grating structure further comprises the step of selecting a grating structure from one of a group including multiple corrugations formed on the surface of said optical waveguide and refractive index variations in the substrate of said optical waveguide.

19. A slow wave electrooptic intensity modulator method for changing the intensity of an incident light wave comprising the steps of:

(a) providing a substrate material which exhibits a linear electrooptic effect;

(b) forming an optical waveguide interferometer on said substrate and positioning said optical waveguide interferometer to receive said incident light wave, said optical waveguide interferometer comprising an input single mode waveguide section, a waveguide branch diverging two single mode waveguide sections, and a second waveguide branch whereby said two single mode waveguide sections converged to form an output single mode waveguide section;

(c) disposing two slow wave optical propagation regions in said two single mode waveguide sections between said two branches, each comprising a grating structure integrated with said two waveguide sections, such that said grating structure is disposed to produce contradirectional coupling of light in said optical waveguide, thereby decreasing the forward propagation velocity of said light;

(d) providing a source of electrical potential;

(e) connecting electrodes to said source of electrical potential and disposing said electrodes so as to produce electric fields of opposite sense in said slow wave propagation regions of said two waveguide sections, in response to said source of electrical potential; and (f) activating said source of electrical potential.

20. The method of claim 19 wherein the step of providing two slow wave optical propagation regions with a grating structure integrated with said waveguide section further comprises the step of selecting a grating structure from a group including forming multiple corrugations on the surface of said optical waveguide and creating variations in the refractive index in the substrate of the optical waveguide.

* * * * *

UNITED STATES PATENT AND TRADEMARK OFFICE
CERTIFICATE OF CORRECTION

PATENT NO. : 6,288,823 B1  Page 1 of 1
DATED : September 11, 2001
INVENTOR(S) : Henry F. Taylor It is certified that error appears in the above-identified patent and that said Letters Patent is hereby corrected as shown below:

Column 6,
Line 48, change " $\pi$ " to -- $\lambda$ --.

Signed and Sealed this

Twelfth Day of March, 2002

*Attest:*

JAMES E. ROGAN
*Director of the United States Patent and Trademark Office*

*Attesting Officer*